United States Patent
Otsuki et al.

(10) Patent No.: US 9,718,026 B2
(45) Date of Patent: Aug. 1, 2017

(54) EXHAUST GAS PURIFICATION FILTER

(71) Applicants: Hiroshi Otsuki, Gotenba (JP);
Hiromasa Nishioka, Susono (JP);
Yoshihisa Tsukamoto, Susono (JP);
Daichi Imai, Shizuoka-ken (JP);
Kazuhiro Itoh, Mishima (JP); Ryota Koutake, Susono (JP)

(72) Inventors: Hiroshi Otsuki, Gotenba (JP);
Hiromasa Nishioka, Susono (JP);
Yoshihisa Tsukamoto, Susono (JP);
Daichi Imai, Shizuoka-ken (JP);
Kazuhiro Itoh, Mishima (JP); Ryota Koutake, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 127 days.

(21) Appl. No.: 14/647,614

(22) PCT Filed: Nov. 28, 2012

(86) PCT No.: PCT/JP2012/080770
§ 371 (c)(1),
(2) Date: May 27, 2015

(87) PCT Pub. No.: WO2014/083642
PCT Pub. Date: Jun. 5, 2014

(65) Prior Publication Data
US 2015/0298058 A1 Oct. 22, 2015

(51) Int. Cl.
*B01D 50/00* (2006.01)
*B01D 53/94* (2006.01)
(Continued)

(52) U.S. Cl.
CPC .............. *B01D 53/94* (2013.01); *B01J 23/40* (2013.01); *B01J 35/0006* (2013.01);
(Continued)

(58) Field of Classification Search
CPC .. F01N 3/035; F01N 2510/0682; B01J 35/10; B01J 23/40; B01D 46/2444; B01D 2046/2496; B01D 2279/30
(Continued)

(56) References Cited

U.S. PATENT DOCUMENTS 5,258,349 A * 11/1993 Dalla Betta .............. B01J 23/44
502/330
7,118,717 B2 * 10/2006 Shore .................... B01J 19/2485
422/211
(Continued)

FOREIGN PATENT DOCUMENTS

EP 2436889 A2 4/2012
EP 2832962 A1 2/2015
(Continued)

*Primary Examiner* — Tom P Duong
(74) *Attorney, Agent, or Firm* — Andrews Kurth Kenyon LLP (57) ABSTRACT

An exhaust gas purification filter that is suitable for arrangement in an exhaust passage of an internal combustion engine and for collecting particulate matter contained in exhaust gas, comprises: exhaust gas inflow passages and exhaust gas outflow passages that are arranged alternately; and porous partitions that separate the exhaust gas inflow passages and the exhaust gas outflow passages from each other. Each of the partitions is divided into a coated zone in which a surface of a partition base is coated with a coating layer having a smaller average pore diameter than an average pore diameter of the partition base and a non-coated zone that is located on a downstream side of the coated zone and in which a surface of the partition base is not coated with the coating layer.

8 Claims, 6 Drawing Sheets

(51) Int. Cl.

| | |
|---|---|
| *F01N 3/035* | (2006.01) |
| *F01N 3/022* | (2006.01) |
| *B01J 35/00* | (2006.01) |
| *B01J 23/40* | (2006.01) |
| *B01J 35/02* | (2006.01) |
| *B01J 35/04* | (2006.01) |
| *B01J 35/10* | (2006.01) |
| *B01D 46/24* | (2006.01) |

(52) U.S. Cl.
CPC .............. *B01J 35/023* (2013.01); *B01J 35/04* (2013.01); *B01J 35/10* (2013.01); *B01J 35/1061* (2013.01); *B01J 35/1066* (2013.01); *F01N 3/0222* (2013.01); *F01N 3/035* (2013.01); *B01D 46/2466* (2013.01); *B01D 2046/2437* (2013.01); *F01N 2510/0682* (2013.01)

(58) Field of Classification Search
USPC ............................................ 422/180; 55/523
See application file for complete search history.

(56) References Cited

U.S. PATENT DOCUMENTS

| | | |
|---|---|---|
| 7,179,430 B1 | 2/2007 | Stobbe et al. |
| 2004/0068971 A1 | 4/2004 | Kuki et al. |
| 2006/0039843 A1* | 2/2006 | Patchett ............. B01D 53/9418 423/239.1 |
| 2012/0186229 A1* | 7/2012 | Phillips .............. B01D 53/9418 60/274 |
| 2015/0059321 A1 | 3/2015 | Nakayama et al. |

FOREIGN PATENT DOCUMENTS

| | | |
|---|---|---|
| EP | 2873816 A1 | 5/2015 |
| EP | 2921666 A1 | 9/2015 |
| JP | 2002-519186 A | 7/2002 |
| JP | 2003154223 A | 5/2003 |
| JP | 2004068635 A | 3/2004 |
| JP | 2004130229 A | 4/2004 |
| JP | 2004-239199 A | 8/2004 |
| JP | 2008307456 A | 12/2008 |
| JP | 2009022953 A | 2/2009 |
| JP | 2010227743 A | 10/2010 |
| JP | 2012-077693 A | 4/2012 |
| JP | 2012117487 A | 6/2012 |
| WO | 2010/112781 A1 | 10/2010 |
| WO | 2013/145266 A | 10/2013 |
| WO | 2014/087472 A1 | 6/2014 |

* cited by examiner

EXHAUST GAS PURIFICATION FILTER

CROSS-REFERENCE TO RELATED APPLICATION

This is a national phase application based on the PCT International Patent Application No. PCT/JP2012/080770 filed Nov. 28, 2012, the entire contents of which are incorporated herein by reference.

TECHNICAL FIELD

The present invention relates to an exhaust gas purification filter.

BACKGROUND ART

A compression-ignition internal combustion engine in which a particulate filter that collects particulate matter in exhaust gas is arranged within an exhaust passage has been known. The particulate filter includes exhaust gas inflow passages and exhaust gas outflow passages that are alternately arranged, and porous partitions that separate the exhaust gas inflow passages and the exhaust gas outflow passages from each other. A downstream end of each exhaust gas inflow passage is closed by a downstream-side plug and an upstream end of each exhaust gas outflow passage is closed by an upstream-side plug. Therefore, exhaust gas first flows into the exhaust gas inflow passages, then passes through the surrounding partitions, and flows out into the adjacent exhaust gas outflow passages. As a result, particulate matter in the exhaust gas is collected on the partitions and is thus suppressed from being released into the atmosphere.

However, if the amount of particulate matter collected by the particulate filter increases, pressure loss of the particular filter increases gradually. Consequently, the engine output may be decreased. Thus, in this internal combustion engine, a PM removing process, in which the temperature of the particulate filter is increased while the particulate filter is maintained in an oxidizing atmosphere, is performed to burn the particulate matter, thereby removing it from the particulate filter.

By the way, a non-combustible component called "ash" is contained in exhaust gas. The ash is collected along with the particulate matter on the particulate filter. However, even if the PM removing process is performed, the ash is not burnt or vaporized but remains on the particulate filter. Thus, as the operating time of the engine becomes longer, the amount of the ash collected on the particulate filter increases gradually, and the pressure loss increases gradually in the particulate filter. Consequently, output of the engine may decrease even if the PM removing process is repeatedly performed.

In view of this, a particulate filter in which a through-hole is formed in each downstream-side plug to allow the ash to flow out of the particulate filter through the through-holes has been known (see Patent Literature 1). In the Patent Literature 1, as the operating time of the engine becomes longer, the through-holes are blocked by particulate matter. When the through-holes are blocked, the particulate filter can collect particulate matter in the same manner as a conventional particulate filter that does not have any through-holes. Next, after a PM removing process is performed, the particulate matter blocking the through-hole is removed and thus the through-holes are opened. As a result, the ash on the particulate filter is discharged from the particulate filter through the through-holes.

RELATED ART LITERATURE

Patent Literature

PATENT LITERATURE 1: Japanese Patent Application Publication No. 2004-130229

SUMMARY OF THE INVENTION

Technical Problem

However, according to the Patent Literature 1, particulate matter flows out of the particulate filter through the through-holes during a period from the start of the operation of the engine or the end of the PM removing process until blocking of the through-holes. Further, in the Patent Literature 1, because the diameter of each through-hole is set to 0.2 mm or more, a considerable amount of time is required for the through-holes having such a large diameter to be closed by particulate matter. This means that quite a large amount of the particulate matter flows out of the particulate filter through the through-holes.

An object of the invention is to provide an exhaust gas purification filter that can suppress an increase in pressure loss of the exhaust gas purification filter caused by the ash while reliably collecting particulate matter.

Means for Solving the Problem

The invention provides an exhaust gas purification filter that is suitable for arrangement in an exhaust passage of an internal combustion engine and for collecting particulate matter contained in exhaust gas, the exhaust gas purification filter comprising: exhaust gas inflow passages and exhaust gas outflow passages that are arranged alternately; and porous partitions that separate the exhaust gas inflow passages and the exhaust gas outflow passages from each other, wherein each of the partitions is divided into a coated zone in which a surface of a partition base is coated with a coating layer having a smaller average pore diameter than an average pore diameter of the partition base and a non-coated zone that is located on a downstream side of the coated zone and in which a surface of the partition base is not coated with the coating layer, wherein a pore diameter of the partitions is set such that ash contained in the exhaust gas is able to pass through the partitions in the non-coated zone, and wherein a passage resistance of a partition portion located in the coated zone, the passage resistance being in a thickness direction of the partition portion located in the coated zone, is lower than a passage resistance of a partition portion located in the non-coated zone, the passage resistance being in a thickness direction of the partition portion located in the non-coated zone.

Preferably, the number of pores in a partition base portion located in the coated zone is larger than the number of pores in a partition base portion located in the non-coated zone. Further preferably, a length of the coated zone in a longitudinal direction of the coated zone is longer than a length of the non-coated zone in a longitudinal direction of the non-coated zone. Further preferably, a pore density of the partition base portion located in the coated zone is higher than a pore density of the partition base portion located in the non-coated zone.

Preferably, an average pore diameter of a partition base portion located in the coated zone is larger than an average pore diameter of a partition base portion located in the non-coated zone.

Preferably, a thickness of a partition base portion located in the coated zone is smaller than a thickness of a partition base portion located in the non-coated zone.

Preferably, an average pore diameter of the partition base is set to 25 μm or more and 100 μm or less.

Preferably, the coating layer is formed from metallic particles having an oxidizing function.

Preferably, an average diameter of particles that form the coating layer is set to 1 μm or more and 10 μm or less.

Advantageous Effects of Invention

The exhaust gas purification filter of the invention can suppress an increase in pressure loss of the exhaust gas purification filter caused by the ash while reliably collecting particulate matter.

MODES FOR CARRYING OUT THE INVENTION

Figure 1:
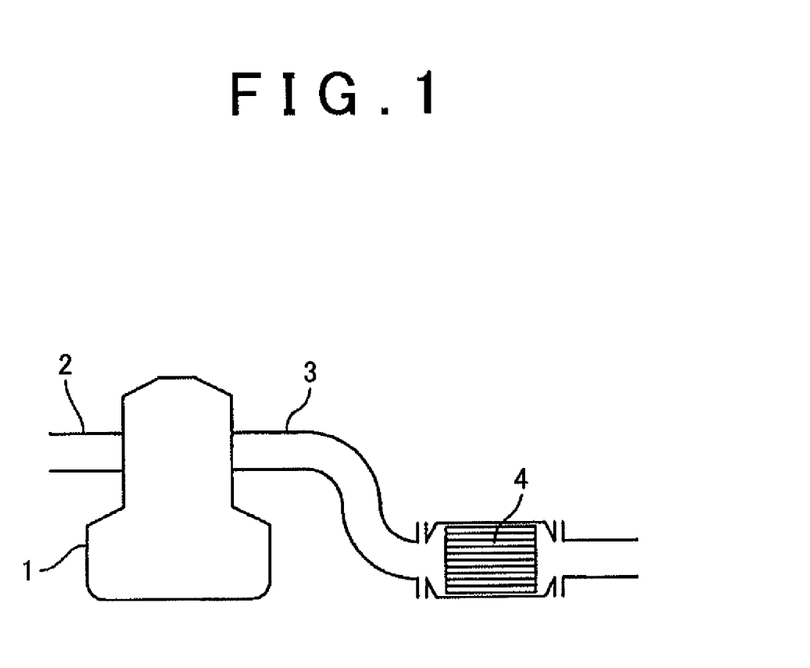
FIG. 1 is an overall view of an internal combustion engine according to an embodiment of the invention.

With reference to FIG. 1, a reference numeral 1 denotes a body of an internal combustion engine, a reference numeral 2 denotes an intake passage, a reference numeral 3 denotes an exhaust passage, and a reference numeral 4 denotes an exhaust gas purification filter that is arranged within the exhaust passage 3. In an embodiment shown in FIG. 1, the exhaust gas purification filter 4 is constructed of a wall-flow particulate filter. In the embodiment shown in FIG. 1, the internal combustion engine is constructed of a compression-ignition internal combustion engine. In another embodiment, the internal combustion engine is constructed of a spark-ignition internal combustion engine.

Figure 2A:
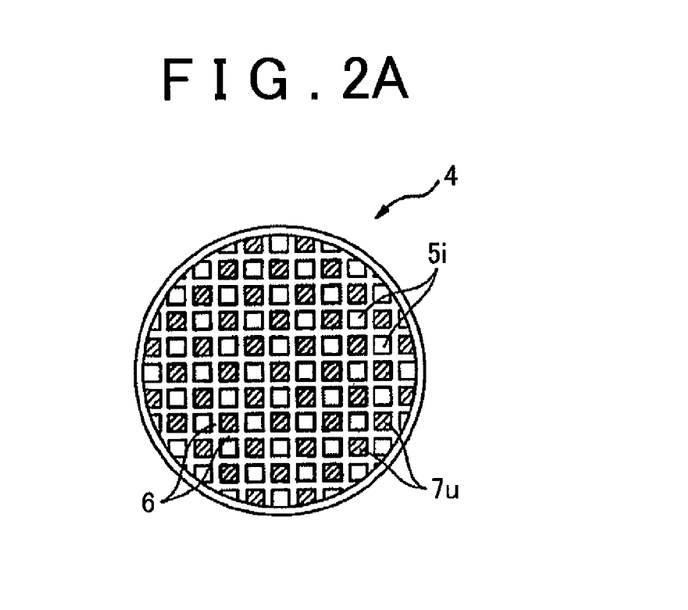
FIG. 2A is a front view of a particulate filter.
Figure 2B:
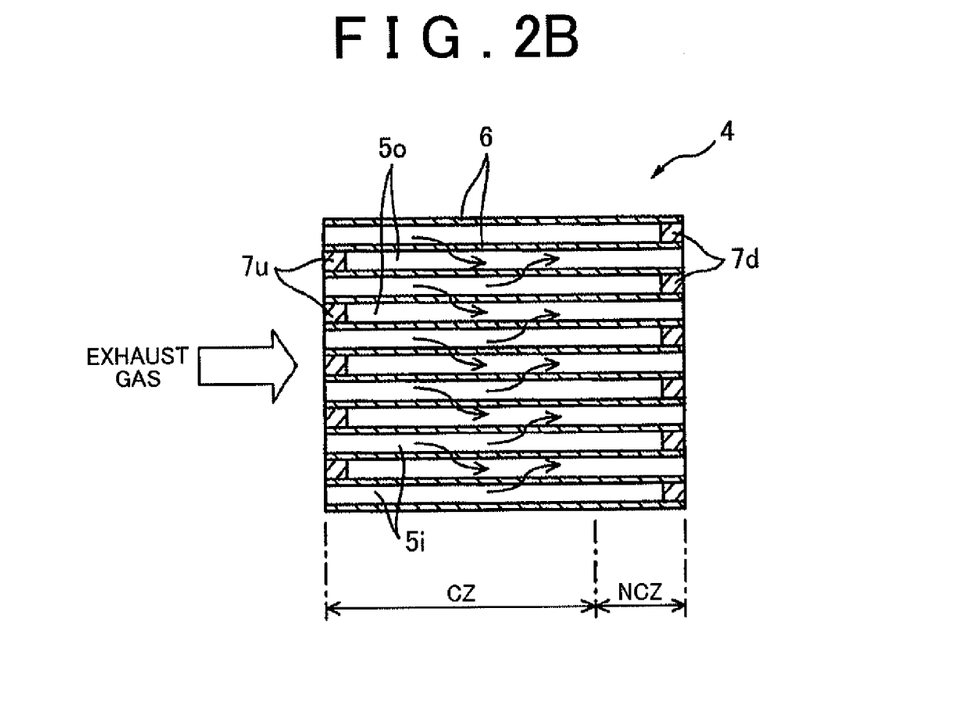
FIG. 2B is a side cross-sectional view of the particulate filter.

FIGS. 2A and 2B show a structure of the particulate filter 4. FIG. 2A shows a front view of the particulate filter 4, and FIG. 2B shows a side sectional view of the particulate filter 4. As shown in FIGS. 2A and 2B, the particulate filter 4 has a honeycomb structure, and includes a plurality of exhaust flow passages 5$i$, 5$o$ extending parallel to each other, and partitions 6 that separate the exhaust flow passages 5$i$, 5$o$ from each other. In the embodiment shown in FIG. 2A, the exhaust flow passages 5$i$, 5$o$ are constructed of exhaust gas inflow passages 5$i$ with their upstream ends opened and with their downstream ends closed by plugs 7$d$, and exhaust gas outflow passages 5$o$ with their upstream ends closed by plugs 7$u$ and with their downstream ends opened. In FIG. 2A, hatched portions show the plugs 7$u$. Thus, the exhaust gas inflow passages 5$i$ and the exhaust gas outflow passages 5$o$ are alternately arranged with the partitions 6, which are thin walls, interposed therebetween. In other words, the exhaust gas inflow passages 5$i$ and the exhaust gas outflow passages 5$o$ are arranged such that each of the exhaust gas inflow passages 5$i$ is surrounded by four exhaust gas outflow passages 5$o$, and each of the exhaust gas outflow passages 5$o$ is surrounded by four exhaust gas inflow passages 5$i$. In another embodiment, the exhaust flow passages are constructed of the exhaust gas inflow passages with their upstream ends and downstream ends opened, and the exhaust gas outflow passages with their upstream ends closed by plugs and with their downstream ends opened.

Figure 3:
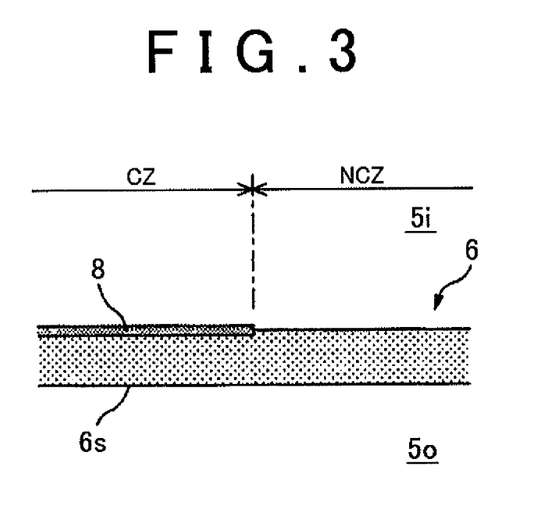
FIG. 3 is a partially-enlarged sectional view of a partition.

As shown in FIG. 2B, each of the partitions 6 is divided into a coated zone CZ and a non-coated zone NCZ that is positioned on the downstream side of the coated zone CZ. As shown in FIG. 3, in the coated zone CZ, a surface of a base 6$s$ of the partition 6 is covered with a coating layer 8. In contrast to this, in the non-coated zone NCZ, a surface of the partition base 6$s$ is not covered with the coating layer 8 described above.

In the embodiment shown in FIG. 3, the coating layer 8 is provided on one surface of the partition base 6$s$, which faces the exhaust gas inflow passage 5$i$. No coating layer 8 is provided on one surface of the partition base 6$s$, which faces the exhaust gas outflow passage 5$o$. In another embodiment, the coating layer 8 is provided on one surface of the partition base 6$s$, which faces the exhaust gas outflow passage 5$o$. No coating layer 8 is provided on one surface of the partition base 6$s$, which faces the exhaust gas inflow passage 5$i$. In yet another embodiment, the coating layer 8 is provided on each of both surfaces of the partition base 6$s$, which respectively face the exhaust gas inflow passage 5$i$ and the exhaust gas outflow passage 5$o$.

In the embodiment shown in FIG. 2B, the upstream edge of each coated zone CZ substantially coincides with the upstream end of each partition 6. In another embodiment, the upstream edge of each coated zone CZ is positioned on the downstream side of the upstream end of each partition 6. In the embodiment shown in FIG. 2B, the downstream edge of each non-coated zone NCZ substantially coincides with the downstream end of each partition 6. In another embodiment, the downstream edge of each non-coated zone NCZ is positioned on the upstream side of the downstream end of each partition 6.

The partition base 6$s$ is formed from a porous material that is, for example, ceramics such as cordierite, silicon carbide, silicon nitride, zirconia, titania, alumina, silica, mullite, lithium aluminum silicate, and zirconium phosphate.

Figure 4:
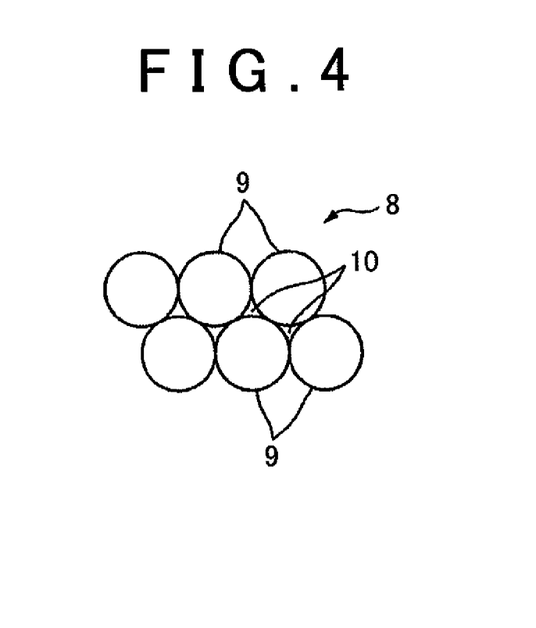
FIG. 4 is a partially-enlarged sectional view of a coating layer.

On the other hand, as shown in FIG. 4, the coating layer 8 is formed from a large number of particles 9, and includes a large number of voids or pores 10 between the particles 9. Thus, the coating layer 8 is porous. Therefore, as shown by arrows in FIG. 2B, exhaust gas first flows into the exhaust gas inflow passages 5$i$, then passes through the surrounding partitions 6, and flows out into the exhaust gas outflow passages 5$o$ adjacent to the exhaust gas inflow passages 5$i$.

In the embodiment shown in FIG. 4, the particles 9 are made of metal having an oxidizing function. Platinum group metal such as platinum (Pt), rhodium (Rh), or palladium (Pd) can be used as the metal having an oxidizing function.

In another embodiment, the particles 9 are made of ceramic that is similar to the one used for the partition base 6s. In yet another embodiment, the particles 9 are made of one or both of ceramic and metal.

The average pore diameter of the partition base 6s is set to 25 μm or more and 100 μm or less. It has been found by the inventors that most of the ash contained in exhaust gas can pass through the partitions 6 when the average pore diameter of the partition base 6s is 25 μm or more. Thus, in other words, the pore diameter of the partition 6 is set such that the ash contained in exhaust gas can pass through each partition 6 in the non-coated zone NCZ. In view of the fact that the average particle diameter of particulate matter is smaller than that of the ash, it can also be said that the pore diameter of the partition 6 is set such that particulate matter and the ash can pass through the partition 6 in the non-coated zone NCZ.

The average pore diameter of the coating layer 8 is set smaller than the average pore diameter of the partition base 6s. Specifically, the average pore diameter of the coating layer 8 is set such that the coating layer 8 can collect the particulate matter contained in exhaust gas. Further, the average diameter of the particles 9 (secondary particles) is set to 1 μm or more and 10 μm or less. When the average diameter of the particles 9 is less than 1 μm, the amount of the particulate matter which passes through the coating layer 8 exceeds the allowable amount. Further, if the average diameter of the particles 9 is more than 10 μm, the pressure loss of the particulate filter 4 or the coating layer 8 exceeds the allowable value.

In the embodiment of the invention, the average pore diameter of the partition base means a median diameter (50% of the diameter) of the pore diameter distribution obtained by the mercury penetration method, and the average diameter of particles means a median diameter (50% of the diameter) of the volume-based particle size distribution obtained by a laser diffraction and scattering method.

Particulate matter that is formed mainly from solid carbon is contained in exhaust gas. This particulate matter is collected on the particulate filter 4.

The ash is also contained in exhaust gas. The ash is collected by the particulate filter 4, together with the particulate matter. It has been confirmed by the inventors of the invention that the ash is formed mainly from calcium salt, such as calcium sulfate ($CaSO_4$) and zinc calcium phosphate $Ca_{19}Zn_2(PO_4)_{14}$. Calcium (Ca), zinc (Zn), phosphorus (P), and the like are derived from engine lubricant oil. Sulfur (S) is derived from fuel. That is, if calcium sulfate ($CaSO_4$) is taken as an example for the description, the engine lubricant oil flows into a combustion chamber 2 and is burnt in the chamber, and calcium (Ca) in the lubricant oil is bonded to sulfur (S) in the fuel, thereby producing calcium sulfate ($CaSO_4$).

According to the inventors of the invention, it has been confirmed that, when a conventional particulate filter that has an average pore diameter of approximately 10 to 25 μm and that does not include the coating layer 8, that is, a particulate filter through which the ash can hardly pass, is arranged within the exhaust passage of the engine, particulate matter tends to be deposited more on the upstream portion of the partition 6 than on the downstream portion of the partition 6. It has been further confirmed that the ash tends to be deposited more on the downstream portion of the partition 6 than on the upstream portion of the partition 6.

Figure 5:
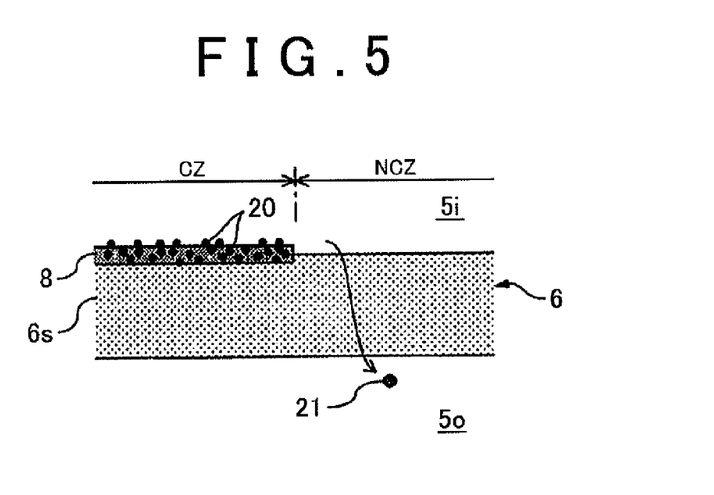
FIG. 5 is a schematic view for explaining an operation of the particulate filter.

Thus, in the embodiment of the invention, the coated zone CZ is provided on the upstream side of each partition 6, and the non-coated zone NCZ is provided on the downstream side of each partition 6. Consequently, as shown in FIG. 5, particulate matter 20 is collected by the partition 6 in the coated zone CZ on the upstream side, and the ash 21 passes through the partition 6 in the non-coated zone NCZ on the downstream side. Therefore, the ash can be suppressed from being deposited on the particulate filter 4 while particulate matter is suppressed from passing through the particulate filter 4. In other words, an increase in pressure loss of the particulate filter 4, caused by the ash, can be suppressed while particulate matter is reliably collected.

In the embodiment shown in FIG. 1, each time the amount of particulate matter collected on the particulate filter 4 exceeds the upper limit amount, a PM removing process is performed to remove particulate matter from the particulate filter 4. In the PM removing process, for example, while the particulate filter is maintained in an oxidizing atmosphere, the temperature of the particulate filter is increased, and therefore the particulate matter is burnt.

By the way, if the particulate matter reaches the non-coated zone NCZ without being collected by the partition 6 in the coated zone CZ, the particulate matter passes through the partition 6 in the non-coated zone NCZ and is discharged into the atmosphere.

Thus, in the embodiment of the invention, the partition 6 is formed such that a passage resistance of a partition portion located in the coated zone CZ, the passage resistance being in a thickness direction of the partition portion located in the coated zone CZ, is lower than a passage resistance of a partition portion located in the non-coated zone NCZ, the passage resistance being in a thickness direction of the partition portion located in the non-coated zone NCZ. As a result, passing of the exhaust gas, which has flowed into the exhaust gas inflow passage 5i, through the partition portion located in the coated zone CZ is facilitated, whereas passing of the exhaust gas, which has flowed into the exhaust gas inflow passage 5i, through the partition portion located in the non-coated zone NCZ is suppressed. Thus, an increase in pressure loss of the particulate filter 4 caused by the ash can be further suppressed while the particulate matter is collected more reliably.

Figure 6:
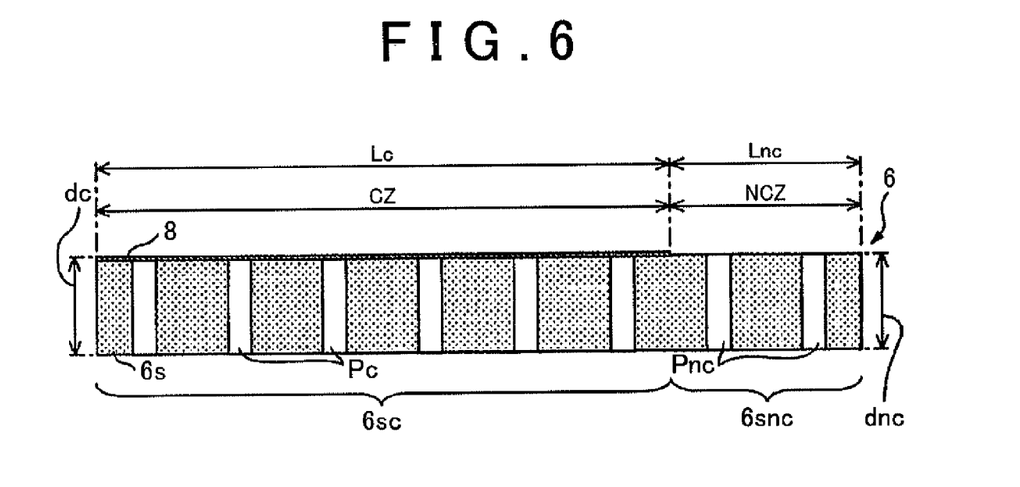
FIG. 6 is a schematic view of the partition.

The detailed description will be made with reference to FIG. 6. FIG. 6 schematically shows the partition 6 of the embodiment shown in FIG. 2B. In FIG. 6, Pc indicates pores formed in a partition base portion 6sc located in the coated zone CZ while Pnc indicates pores formed in a partition base portion 6snc located in the non-coated zone NCZ. As shown in FIG. 6, the average pore diameter and the pore density of the partition base portion 6sc located in the coated zone CZ are substantially equal to the average pore diameter and the pore density of the partition base portion 6snc located in the non-coated zone NCZ, respectively. The pore density of the partition base portion is the number of the pores per unit volume of the partition base portion and is also expressed by a porosity of the partition base portion. Further, a thickness dc of the partition base portion 6sc located in the coated zone CZ and a thickness dnc of the partition base portion 6snc located in the non-coated zone NCZ are also substantially equal to each other. In addition, in the embodiment shown in FIG. 6, a length Lc of the coated zone CZ in its longitudinal direction is longer than a length Lnc of the non-coated zone NCZ in its longitudinal direction. In other words, the length Lc of the partition base portion 6sc located in the coated zone CZ is longer than the length Lnc of the partition base portion 6snc located in the non-coated zone NCZ. As a result, the number of the pores in the partition base portion 6sc located in the coated zone CZ is larger than the number of the pores in the partition base portion 6snc located in the non-coated zone NCZ. Thus, the passage resistance of the partition portion located in the coated zone CZ becomes lower than the passage resistance of the partition portion located in the non-coated zone NCZ.

In the embodiment shown in FIG. 6, a coating layer is not provided in the non-coated zone NCZ. In another embodiment, another coating layer which is different from the coating layer 8 is provided in the non-coated zone NCZ. In this case, the average pore diameter of the partition base portion 6snc located in the non-coated zone NCZ in the state in which the other coating layer is provided is substantially equal to the average pore diameter of the partition base portion 6sc located in the coated zone CZ, and is set to 25 μm or more and 100 μm or less. The other coating layer is formed of a catalytic coating layer which carries metal having an oxidizing function, for example. As a result, particulate matter that has reached the non-coated zone NCZ can be oxidized and removed easily.

Figure 7:
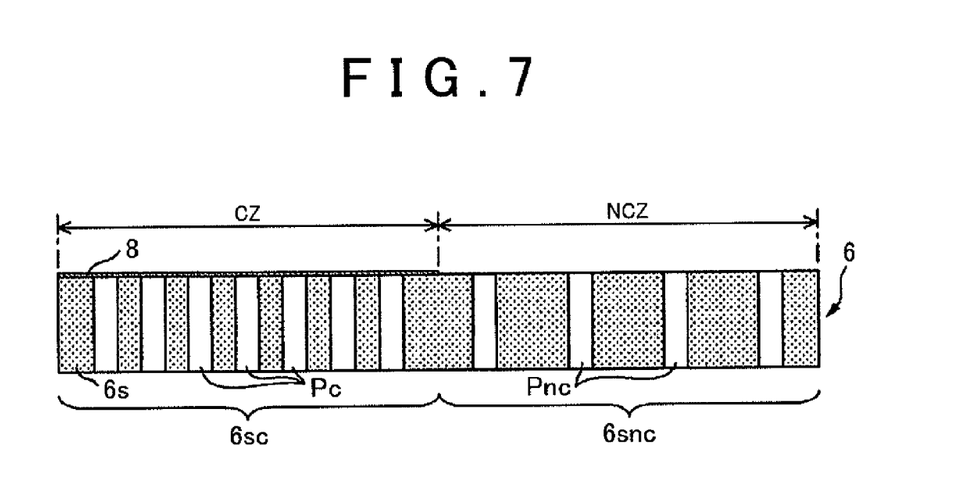
FIG. 7 is a schematic view of a partition according to another embodiment of the invention.

FIG. 7 shows yet another embodiment of the invention. Hereinafter, the differences from the embodiment shown in FIG. 6 will be described.

In the embodiment shown in FIG. 7, the length of the coated zone CZ in its longitudinal direction is substantially equal to the length of the non-coated zone NCZ in its longitudinal direction, and the average pore diameter and the thickness of the partition base portion 6sc located in the coated zone CZ are substantially equal to the average pore diameter and the thickness of the partition base portion 6snc located in the non-coated zone NCZ, respectively. In addition, the pore density of the partition base portion 6sc located in the coated zone CZ is higher than the pore density of the partition base portion 6snc located in the non-coated zone NCZ. As a result, the number of the pores in the partition base portion 6sc is larger than the number of the pores in the partition base portion 6snc. Accordingly, the passage resistance of the partition portion located in the coated zone CZ is lower than the passage resistance of the partition portion located in the non-coated zone NCZ.

For example, the pores are formed in the partition base as follows. That is, opening agent is mixed with the material of the base, and then the base is burnt. At this time, the opening agent is burnt away, and therefore the pores are formed in the partition base. Thus, the pore density is increased by increasing the amount of the opening agent to be mixed with the base material.

Figure 8:
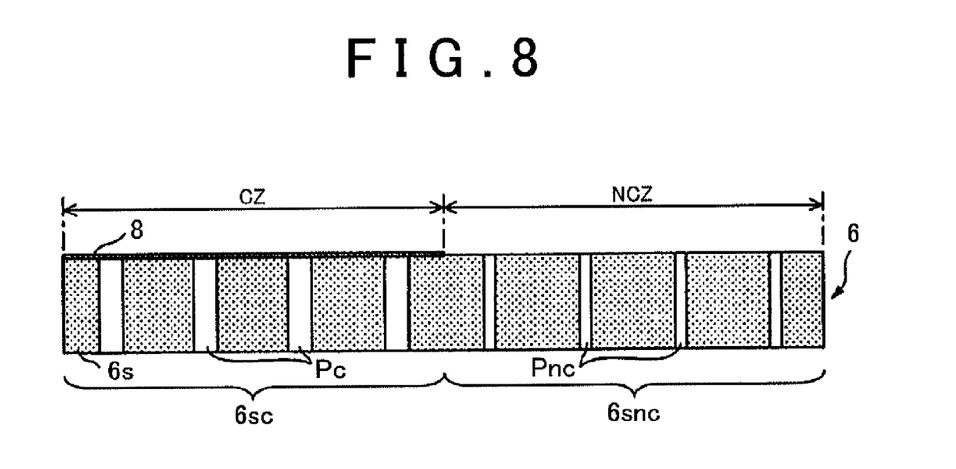
FIG. 8 is a schematic view of a partition according to yet another embodiment of the invention.

FIG. 8 shows yet another embodiment of the invention. Hereinafter, differences from the embodiment shown in FIG. 6 will be described.

In the embodiment shown in FIG. 8, the length of the coated zone CZ in its longitudinal direction is substantially equal to the length of the non-coated zone NCZ in its longitudinal direction, and the pore density and the thickness of the partition base portion 6sc located in the coated zone CZ are substantially equal to the pore density and the thickness of the partition base portion 6snc located in the non-coated zone NCZ, respectively. In addition, the average pore diameter of the partition base portion 6sc located in the coated zone CZ is larger than the average pore diameter of the partition base portion 6snc located in the non-coated zone NCZ. As a result, the passage resistance of the partition portion located in the coated zone CZ becomes lower than the passage resistance of the partition portion located in the non-coated zone NCZ.

Figure 9:
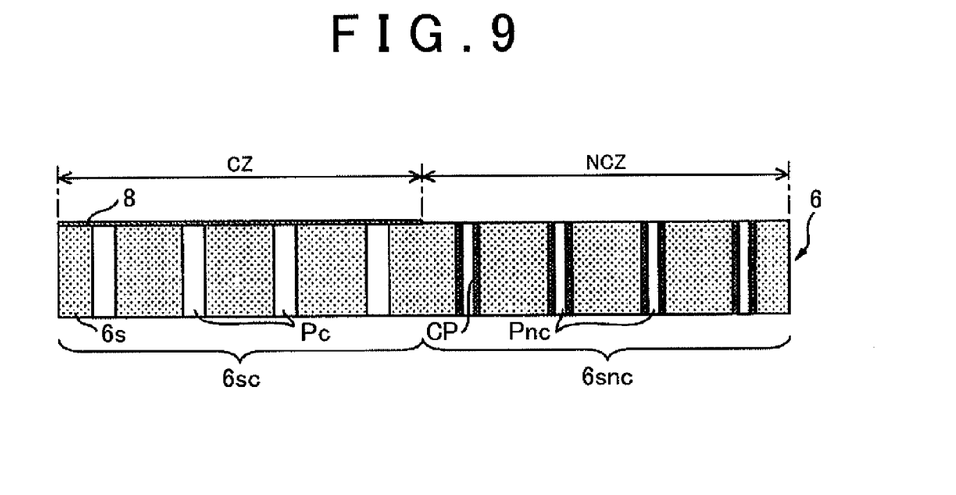
FIG. 9 is a schematic view of a partition according to yet another embodiment of the invention.

FIG. 9 shows yet another embodiment of the invention. Hereinafter, differences from the embodiment shown in FIG. 8 will be described.

In the embodiment shown in FIG. 9, a partition is prepared in which the length of the coated zone CZ in its longitudinal direction is substantially equal to the length of the non-coated zone NCZ in its longitudinal direction, and the average pore diameter, the pore density, and the thickness of the partition base portion 6sc located in the coated zone CZ are substantially equal to the average pore diameter, the pore density, and the thickness of the partition base portion 6snc located in the non-coated zone NCZ, respectively. Next, an additional coating layer CP is formed on the internal wall surface of each pore Pnc in the partition base portion 6snc located in the non-coated zone NCZ but an additional coating layer CP is not formed on the internal wall surface of each pore Pc in the partition base portion 6snc located in the coated zone NCZ. As a result, the average pore diameter of the partition base portion 6sc located in the coated zone CZ is set to be larger than the average pore diameter of the partition base portion 6snc located in the non-coated zone NCZ. The additional coating layer CP carries catalyst.

Figure 10:
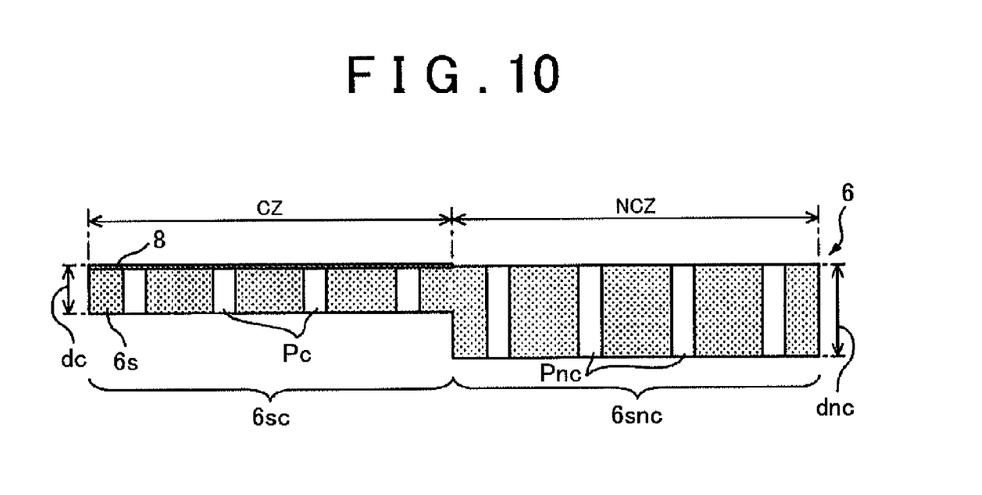
FIG. 10 is a schematic view of a partition according to yet another embodiment of the invention.

FIG. 10 shows yet another embodiment of the invention. Hereinafter, differences from the embodiment shown in FIG. 6 will be described.

In the embodiment shown in FIG. 10, the length of the coated zone CZ in its longitudinal direction is substantially equal to the length of the non-coated zone NCZ in its longitudinal direction, and the average pore diameter and the pore density of the partition base portion 6sc located in the coated zone CZ are substantially equal to the average pore diameter and the pore density of the partition base portion 6snc located in the non-coated zone NCZ, respectively. In addition, a thickness dc of the partition base portion 6sc located in the coated zone CZ is smaller than a thickness dnc of the partition base portion 6snc located in the non-coated zone NCZ. As a result, the passage resistance of the partition portion located in the coated zone CZ becomes lower than the passage resistance of the partition portion located in the non-coated zone NCZ.

In yet another embodiment, at least two of the embodiments shown in FIGS. 6 to 10 are combined with each other. For example, the length of the coated zone CZ in its longitudinal direction is set longer than the length of the non-coated zone NCZ in its longitudinal direction while the pore density of the partition base portion located in the coated zone CZ is set higher than the pore density of the partition base portion 6snc located in the non-coated zone NCZ.

The passage resistance of the partition portion located in the coated zone CZ in its thickness direction depends on not only the passage resistance of the partition base portion 6sc located in the coated zone CZ in its thickness direction, but also the passage resistance of the coating layer 8 in its thickness direction. Thus, in the embodiment shown in FIG. 6, for example, the passage resistance of the partition portion located in the coated zone CZ in its thickness direction is not always lower than the passage resistance of the partition portion located in the non-coated zone NCZ in its thickness direction, even if a length Lc of the coated zone CZ in its longitudinal direction is longer than a length Lnc of the non-coated zone NCZ in its longitudinal direction. Similarly, in the embodiment shown in FIG. 10, the passage resistance of the partition portion located in the coated zone CZ in its thickness direction is not always lower than the passage resistance of the partition portion located in the non-coated zone NCZ in its thickness direction, even if a thickness dc of the partition base portion 6sc located in the coated zone CZ is smaller than a thickness of the partition base portion 6*snc* located in the non-coated zone NCZ. In the invention, the passage resistance of the partition portion located in the coated zone CZ in its thickness direction needs to be lower than the passage resistance of the partition portion located in the non-coated zone NCZ in its thickness direction.

DESCRIPTION OF THE REFERENCE NUMERALS AND SYMBOLS

1/ENGINE BODY
3/EXHAUST PASSAGE
4/PARTICULATE FILTER
5*i*/EXHAUST GAS INFLOW PASSAGE
5*o*/EXHAUST GAS OUTFLOW PASSAGE
6/PARTITION
8/COATING LAYER
CZ/COATED ZONE
NCZ/NON-COATED ZONE

The invention claimed is:

1. An exhaust gas purification filter that is suitable for arrangement in an exhaust passage of an internal combustion engine and for collecting particulate matter contained in exhaust gas, the exhaust gas purification filter comprising:
  exhaust gas inflow passages and exhaust gas outflow passages that are arranged alternately; and
  porous partitions that separate the exhaust gas inflow passages and the exhaust gas outflow passages from each other, wherein
  each of the porous partitions is divided into a coated zone and a non-coated zone,
  the coated zone is configured such that a surface of a partition base is coated with a coating layer,
  an average pore diameter of the coating layer is smaller than an average pore diameter of the partition base,
  the non-coated zone is located on a downstream side of the coated zone and configured such that a surface of the partition base is not coated with the coating layer,
  a pore diameter of the porous partitions is set such that ash contained in the exhaust gas is able to pass through the porous partitions in the non-coated zone,
  passage resistance of a partition portion located in the coated zone, the passage resistance being in a thickness direction of the partition portion located in the coated zone, is lower than a passage resistance of a partition portion located in the non-coated zone, the passage resistance being in a thickness direction of the partition portion located in the non-coated zone, and
  an average pore diameter of the partition base is set to 25 μm or more and 100 μm or less.

2. The exhaust gas purification filter according to claim 1, wherein the number of pores in a partition base portion located in the coated zone is larger than the number of pores in a partition base portion located in the non-coated zone.

3. The exhaust gas purification filter according to claim 2, wherein a length of the coated zone in a longitudinal direction of the coated zone is longer than a length of the non-coated zone in a longitudinal direction of the non-coated zone.

4. The exhaust gas purification filter according to claim 2, wherein a pore density of the partition base portion located in the coated zone is higher than a pore density of the partition base portion located in the non-coated zone.

5. The exhaust gas purification filter according to claim 1, wherein an average pore diameter of a partition base portion located in the coated zone is larger than an average pore diameter of a partition base portion located in the non-coated zone.

6. The exhaust gas purification filter according to claim 1, wherein a thickness of a partition base portion located in the coated zone is smaller than a thickness of a partition base portion located in the non-coated zone.

7. The exhaust gas purification filter according to claim 1, wherein the coating layer is formed from metallic particles having an oxidizing function.

8. The exhaust gas purification filter according to claim 1, wherein an average diameter of particles that form the coating layer is set to 1 μm or more and 10 μm or less.

* * * * *